United States Patent
Misawa et al.

(10) Patent No.: US 11,709,369 B2
(45) Date of Patent: Jul. 25, 2023

(54) HEAD UP DISPLAY APPARATUS

(71) Applicant: MAXELL, LTD., Kyoto (JP)

(72) Inventors: Akio Misawa, Kyoto (JP); Yuji Fujita, Kyoto (JP); Eiji Takatsuka, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 16/760,909

(22) PCT Filed: Oct. 10, 2018

(86) PCT No.: PCT/JP2018/037687
§ 371 (c)(1),
(2) Date: May 1, 2020

(87) PCT Pub. No.: WO2019/102731
PCT Pub. Date: May 31, 2019

(65) Prior Publication Data
US 2021/0041707 A1 Feb. 11, 2021

(30) Foreign Application Priority Data

Nov. 24, 2017 (JP) ................. 2017-225549

(51) Int. Cl.
*G02B 27/01* (2006.01)
*B60K 35/00* (2006.01)
*G09G 3/00* (2006.01)

(52) U.S. Cl.
CPC ......... *G02B 27/0179* (2013.01); *B60K 35/00* (2013.01); *G02B 27/0101* (2013.01);
(Continued)

(58) Field of Classification Search
None
See application file for complete search history.

(56) References Cited

U.S. PATENT DOCUMENTS

| | | | |
|---|---|---|---|
| 2005/0083248 A1* | 4/2005 | Biocca | H04N 13/194 345/8 |
| 2006/0018119 A1 | 1/2006 | Sugikawa et al. | |
| 2009/0237803 A1* | 9/2009 | Hotta | G02B 3/005 359/630 |

(Continued)

FOREIGN PATENT DOCUMENTS

| | | |
|---|---|---|
| DE | 10 2010 040 694 A1 | 3/2012 |
| DE | 10 2014 208 973 A1 | 11/2015 |

(Continued)

OTHER PUBLICATIONS

International Search Report of PCT/JP2018/037687 dated Dec. 18, 2018.

(Continued)

*Primary Examiner* — Christopher R Lamb
(74) *Attorney, Agent, or Firm* — Mattingly & Malur, PC

(57) ABSTRACT

A head up display apparatus includes: an image display apparatus having a light source and a display element and forming an image; an image-light projecting means displaying a virtual image onto a forward part of a vehicle by projecting the image light emitted from the image display apparatus to be reflected on a windshield 3; and a point-of-view detecting system 6 sensing a point of view of the driver. In the head up display apparatus, the image-light projecting means includes a means generating illumination light entirely made of single-color visible light emitted to a face of the driver in a predetermined state of the vehicle.

9 Claims, 11 Drawing Sheets

Figure 1:
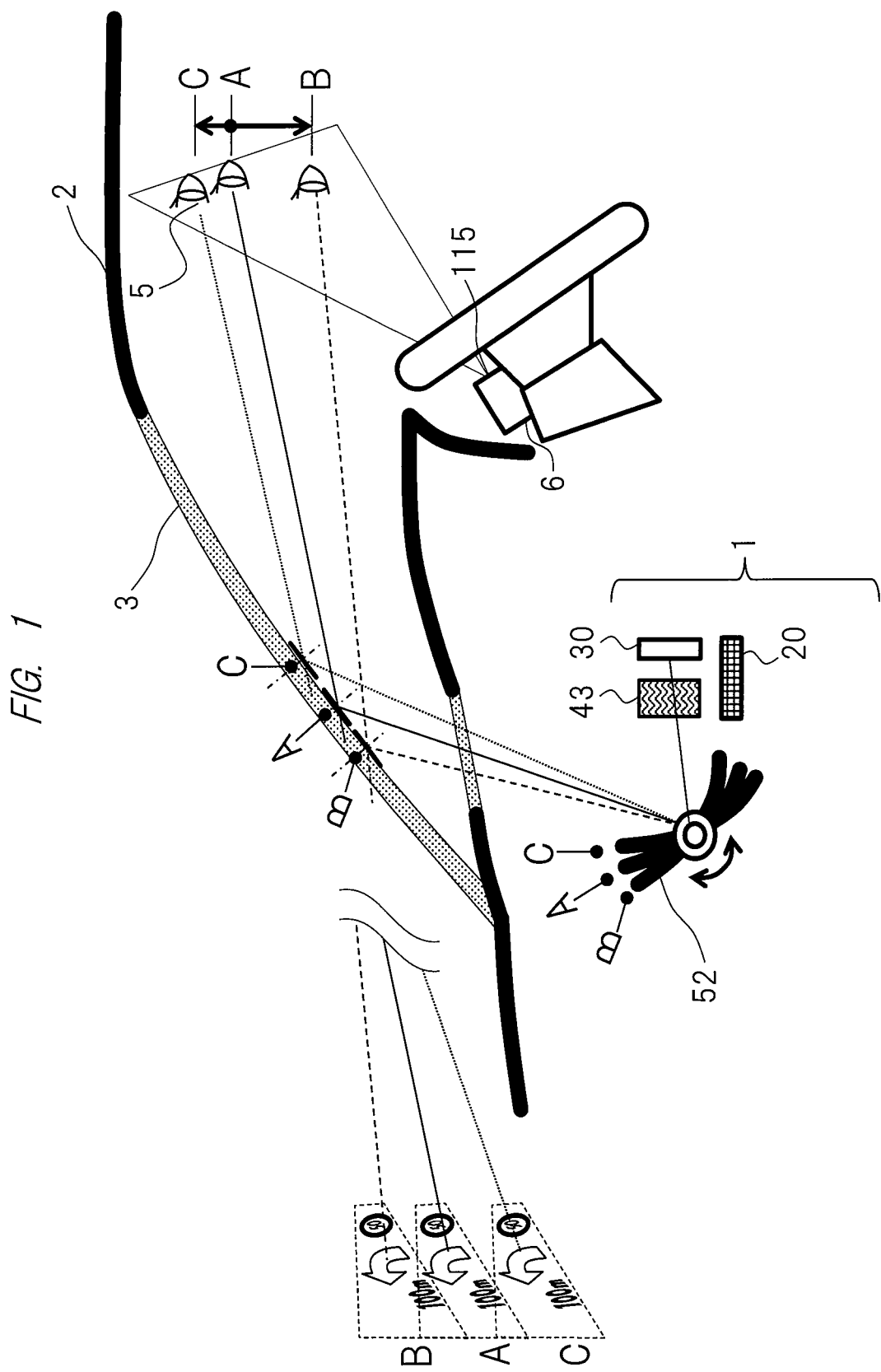

(52) U.S. Cl.
CPC ........ *G09G 3/001* (2013.01); *B60K 2370/149* (2019.05); *B60K 2370/1529* (2019.05); *B60K 2370/21* (2019.05); *B60K 2370/23* (2019.05); *B60K 2370/33* (2019.05); *G02B 2027/0138* (2013.01); *G02B 2027/0181* (2013.01); *G09G 2354/00* (2013.01); *G09G 2380/10* (2013.01)

(56) References Cited

U.S. PATENT DOCUMENTS

| | | | |
|---|---|---|---|
| 2010/0073636 | A1 | 3/2010 | Sasaki et al. |
| 2010/0288573 | A1* | 11/2010 | Nishina .................. B60R 11/04 180/272 |
| 2011/0133916 | A1* | 6/2011 | Suzuki .................... G08G 1/16 340/435 |
| 2013/0020933 | A1 | 1/2013 | Levermore et al. |
| 2013/0138392 | A1 | 5/2013 | Kumon et al. |
| 2013/0249395 | A1 | 9/2013 | Hatakeyama et al. |
| 2014/0152711 | A1* | 6/2014 | Sekiya ................. H04N 9/3194 345/690 |
| 2017/0115485 | A1 | 4/2017 | Saito et al. |
| 2017/0123744 | A1* | 5/2017 | Park ....................... G09G 5/003 |
| 2019/0096359 | A1* | 3/2019 | Uno ......................... G09G 5/10 |
| 2019/0111844 | A1 | 4/2019 | Suzuki et al. |

FOREIGN PATENT DOCUMENTS

| | | |
|---|---|---|
| JP | 8-156646 | 6/1996 |
| JP | 2006-039029 A | 2/2006 |
| JP | 4686586 B2 | 5/2011 |
| JP | 2012-040902 A | 3/2012 |
| JP | 2012-123630 A | 6/2012 |
| JP | 2012-141502 A | 7/2012 |
| JP | 2014-199385 A | 10/2014 |
| JP | 2015-219631 A | 12/2015 |
| JP | 2016-014861 A | 1/2016 |
| JP | 2016-068577 A | 5/2016 |
| JP | 2017-171146 A | 9/2017 |
| JP | 2017-185988 A | 10/2017 |
| JP | 2017-191788 A | 10/2017 |

OTHER PUBLICATIONS

German Office Action received in corresponding German Application No. 11 2018 005 630.9 dated Jan. 5, 2021.

Japanese Office Action received in corresponding Japanese Application No. 2022-059318 dated Feb. 14, 2023.

* cited by examiner

FIG. 2
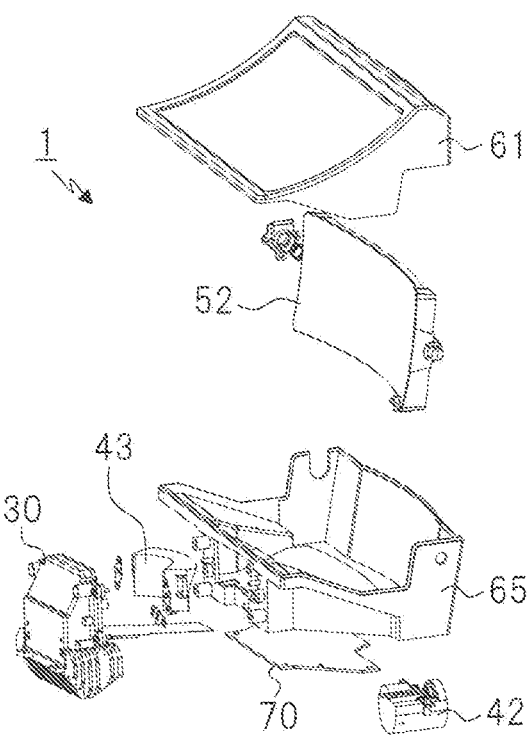
FIG. 3
(a)
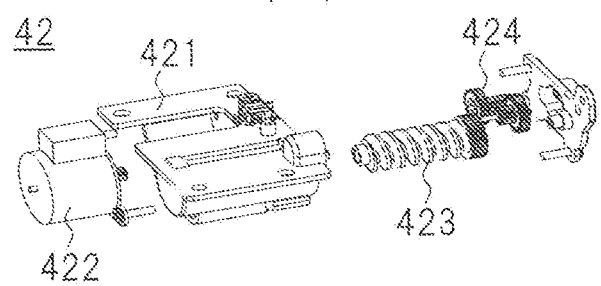
(b)
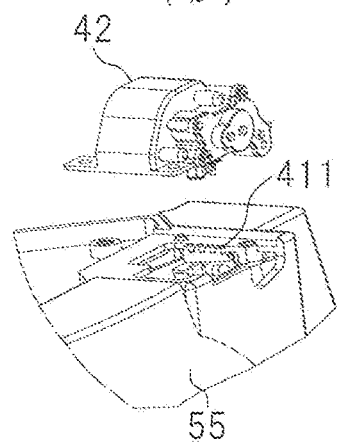

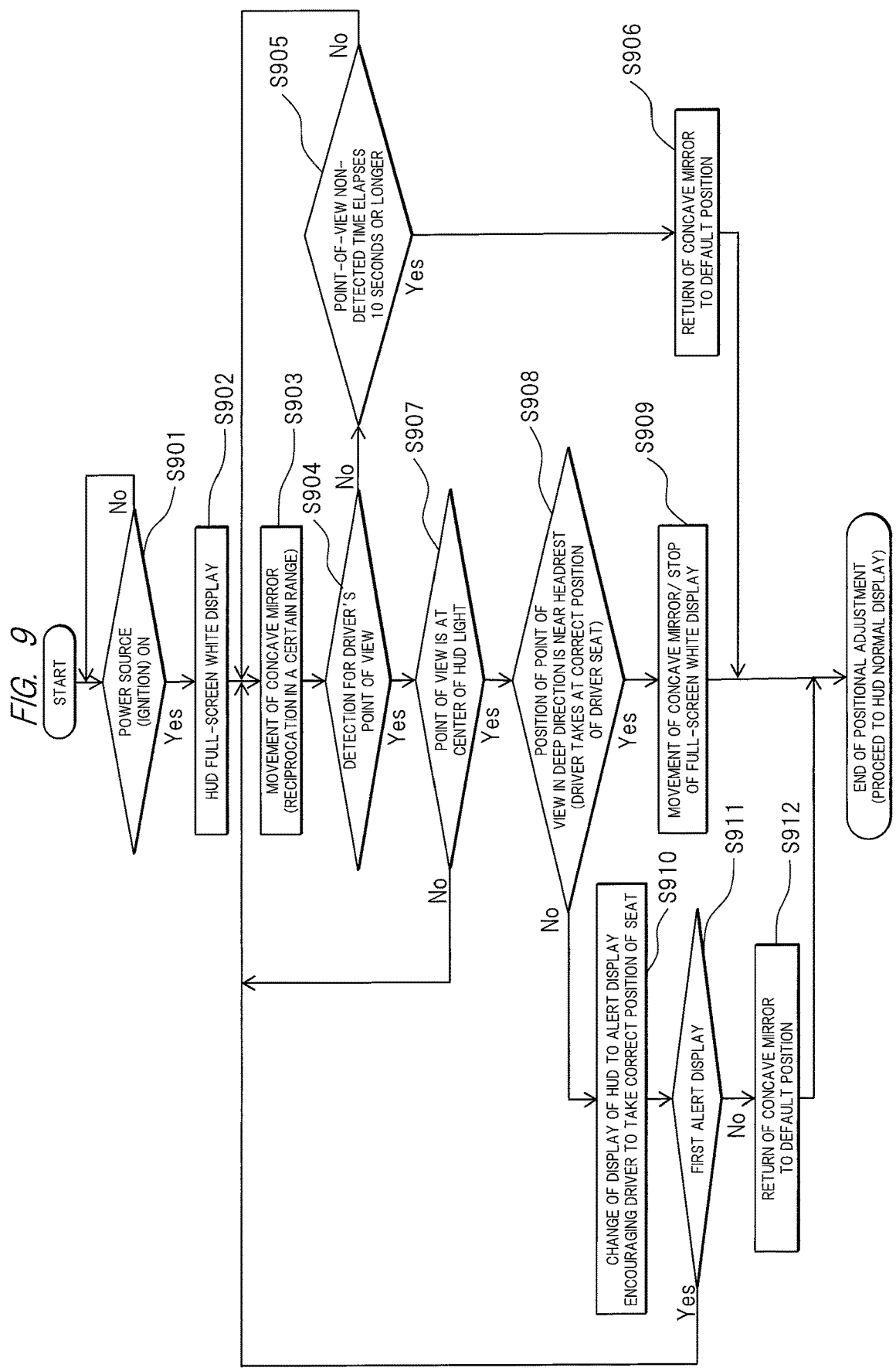

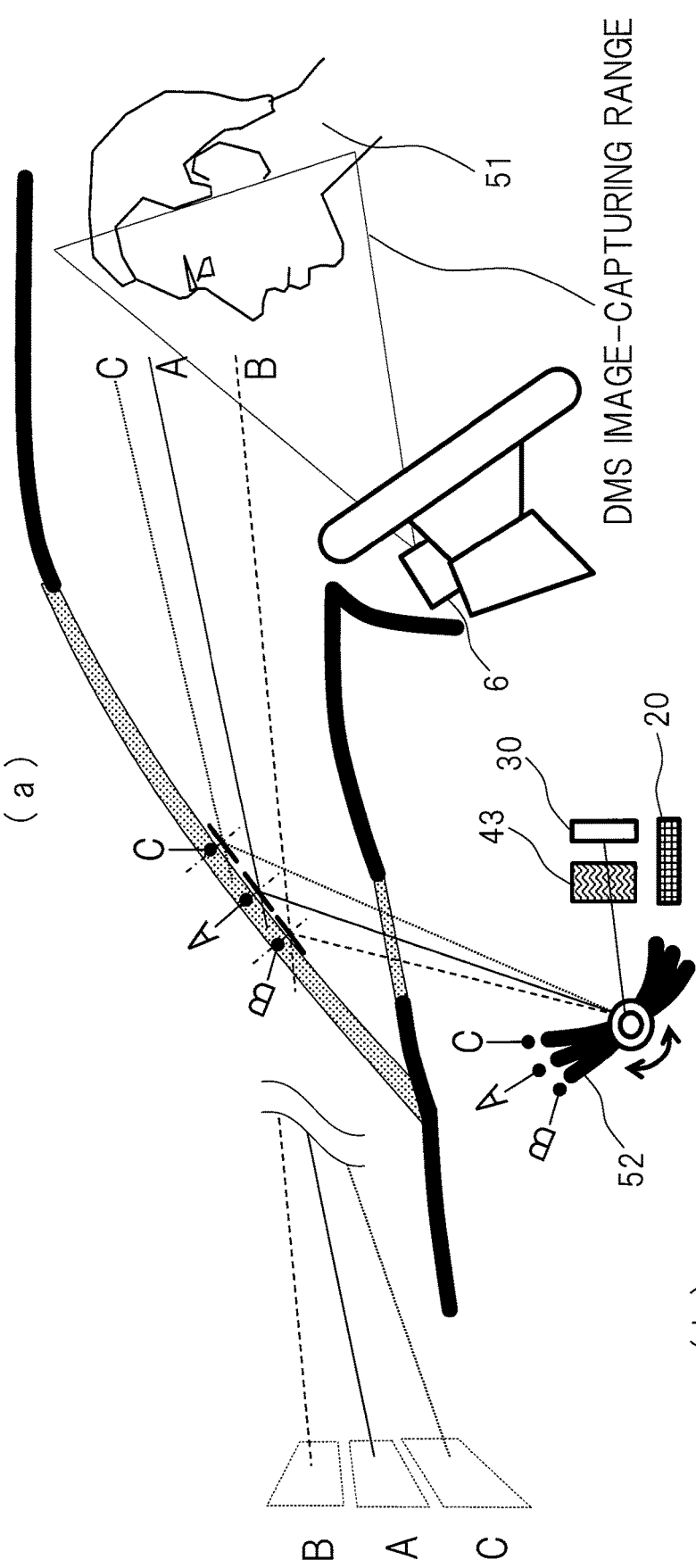
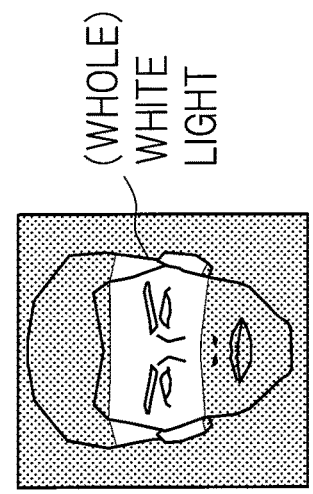
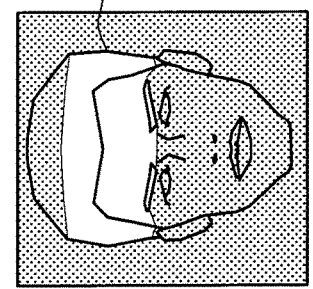
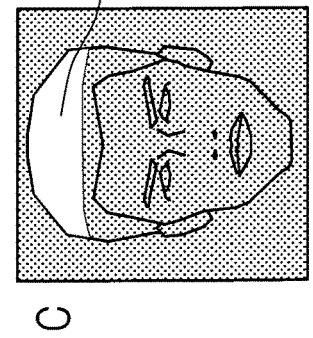

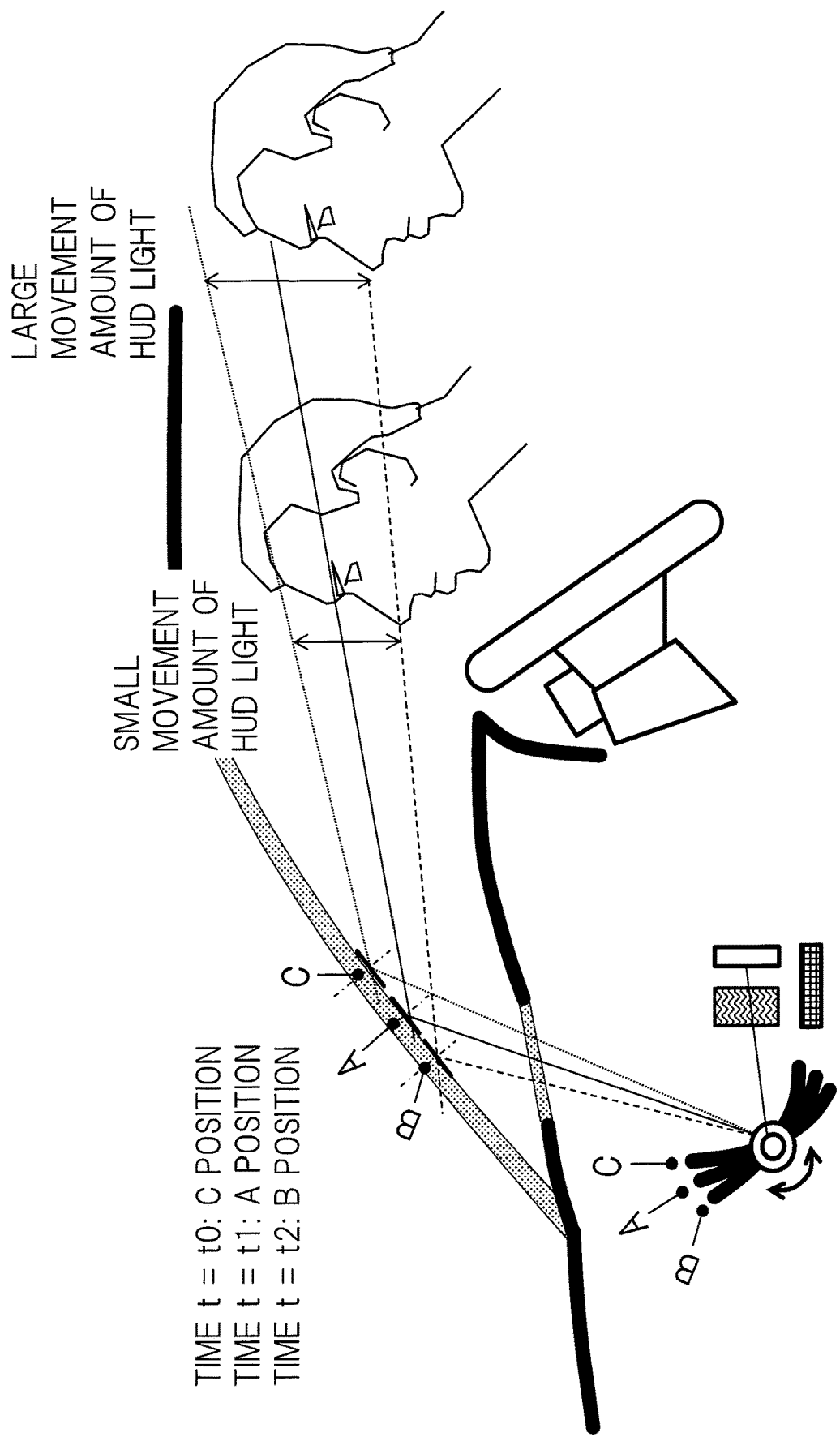

FIG. 12
(a) FACE OF DRIVER IS CLOSER TO FRONT SIDE (STEERING SIDE)
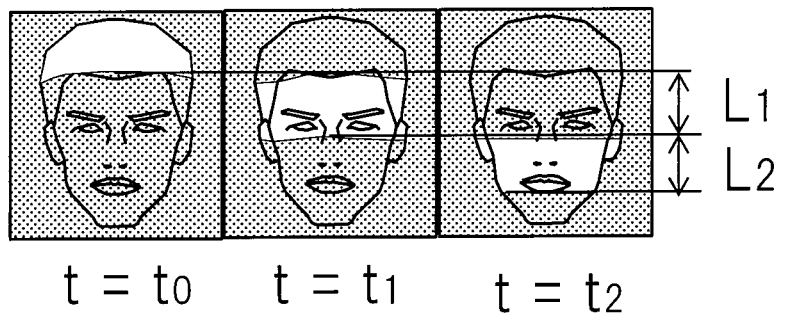
$t = t_0 \quad t = t_1 \quad t = t_2$
$L_1 < L_1'$
$L_2 < L_2'$
(b) FACE OF DRIVER IS CLOSER TO BACK SIDE (HEADREST SIDE)
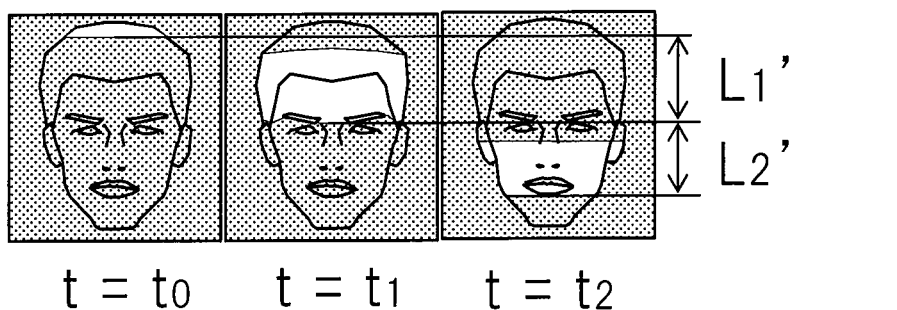
$t = t_0 \quad t = t_1 \quad t = t_2$

HEAD UP DISPLAY APPARATUS

TECHNICAL FIELD

The present invention relates to a technique for a head up display apparatus, and, more particularly relates to a technique effectively applied to a head up display apparatus that projects images onto a transparent glass or others.

BACKGROUND ART

For example, in a vehicle such as a car, information of a car speed, an engine rotating speed and others is normally displayed on an instrument panel inside a dashboard. Pictures of car navigation or others are displayed on a display screen embedded in the dashboard or placed on the dashboard. Since large movement of a line of sight is necessary when a driver visually recognizes such information, a head up display (referred to as "HUD" below in some cases) apparatus that projects and displays information on a car speed or others or information on an instruction or others relating to the car navigation onto a windshield glass or others has been known as a technique for reducing a movement amount of the line of sight.

As a technique relating to such a HUD, for example, each of the following Patent Documents 1 to 3 discloses a technique in combination of the HUD and a point-of-view detecting camera.

The following Patent Document 4 describes a technique using a simple configuration for changing a display position of a projected image that is a virtual image in accordance with a position of a point of view of a viewer.

RELATED ART DOCUMENTS

Patent Documents

Patent Document 1: Japanese Patent Application Laid-Open Publication No. 2016-068577
Patent Document 2: Japanese Patent Application Laid-Open Publication No. 2015-219631
Patent Document 3: Japanese Patent Application Laid-Open Publication No. 2014-199385
Patent Document 4: Japanese Patent Application Laid-Open Publication No. 2016-014861

SUMMARY OF THE INVENTION

Problems to be Solved by the Invention

Each of the above-described related arts, particularly the related art as described in the Patent Document 4, describes that a display position of a projected image is moved in accordance with a point-of-view position of a driver detected by a point-of-view position detecting means such as an infrared camera in order to efficiently orient image light to a viewer. In this case, however, as the point-of-view position detecting means, it is necessary to further attach an infrared-ray generating apparatus, an infrared camera and others into a small room near a driver seat in addition to a normal driver monitoring system for use in sensing posture, a line of sight and others of the driver during the driving to support safety driving. Therefore, this technique undesirably leads to increase in a cost of the apparatus, and is not always suitable.

Accordingly, a purpose of the present invention is to provide a head up display apparatus that is practically excellent and that can cause more favorable control for a virtual-image projection display since a point-of-view position of a driver who is a viewer of the virtual-image projection display is detected by using a driver monitoring system (DMS) or others driven by normal visible light to confirm a position of the driver.

Means for Solving the Problems

The summary of the typical aspects of the present invention will be briefly explained as described in the following claims. As one example, according to the present invention, a head up display apparatus is provided, the head up display apparatus includes: an image display apparatus having a light source and a display element and forming an image; an image-light projecting means displaying a virtual image onto a forward part of a vehicle by projecting the image light emitted from the image display apparatus onto a windshield and causing the image light to be reflected thereon; and a driver's point-of-view sensing means sensing a point of view of the driver, and the image-light projecting means includes a means generating illumination light entirely made of single-color visible light emitted to a face of the driver in a predetermined state of the vehicle.

Effects of the Invention

The effects obtained by the typical aspects of the present invention will be briefly described below. That is, the typical embodiment of the present invention can economically provide a head up display apparatus that is practically excellent and that can cause more favorable control for a virtual-image projection display since a point-of-view position of a driver is exactly confirmed even under circumstances such as nighttime in which sufficient visible light cannot be obtained.

BRIEF DESCRIPTIONS OF THE DRAWINGS

Figure 4:
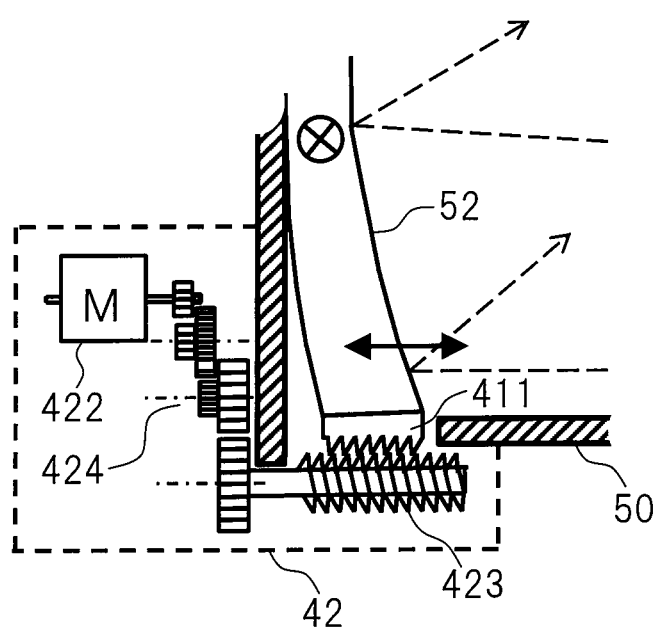
Figure 5:
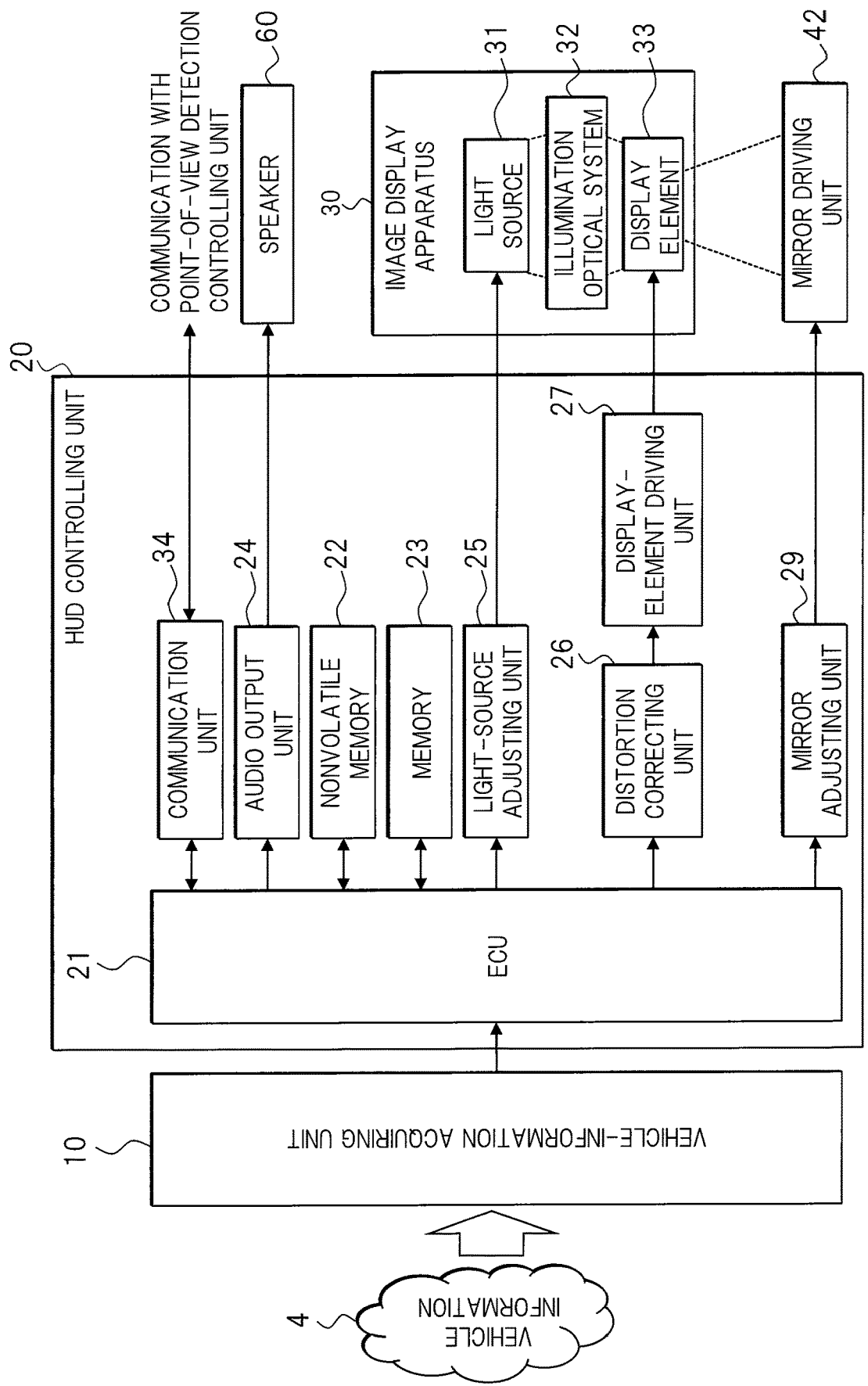
Figure 6:
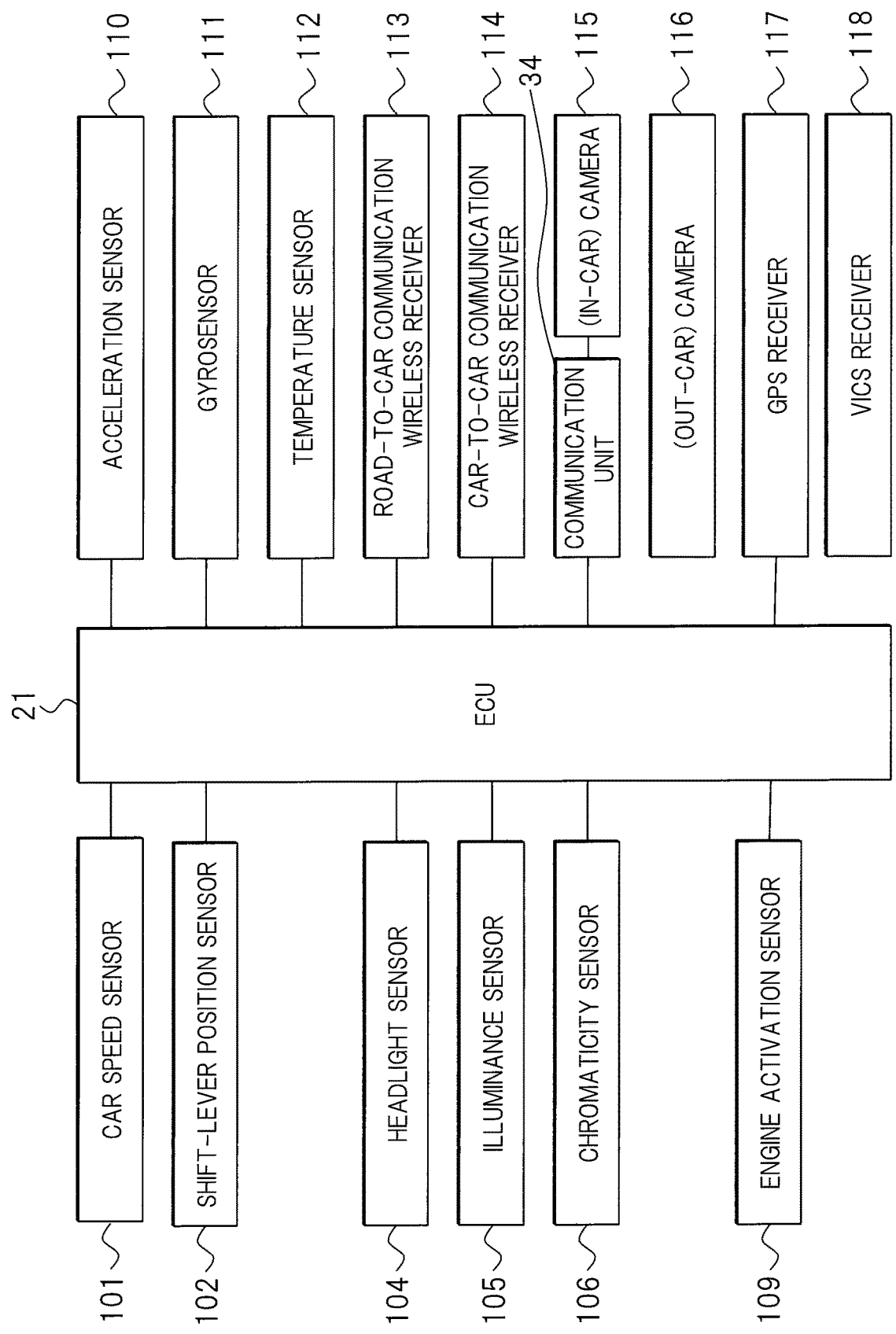
Figure 7:
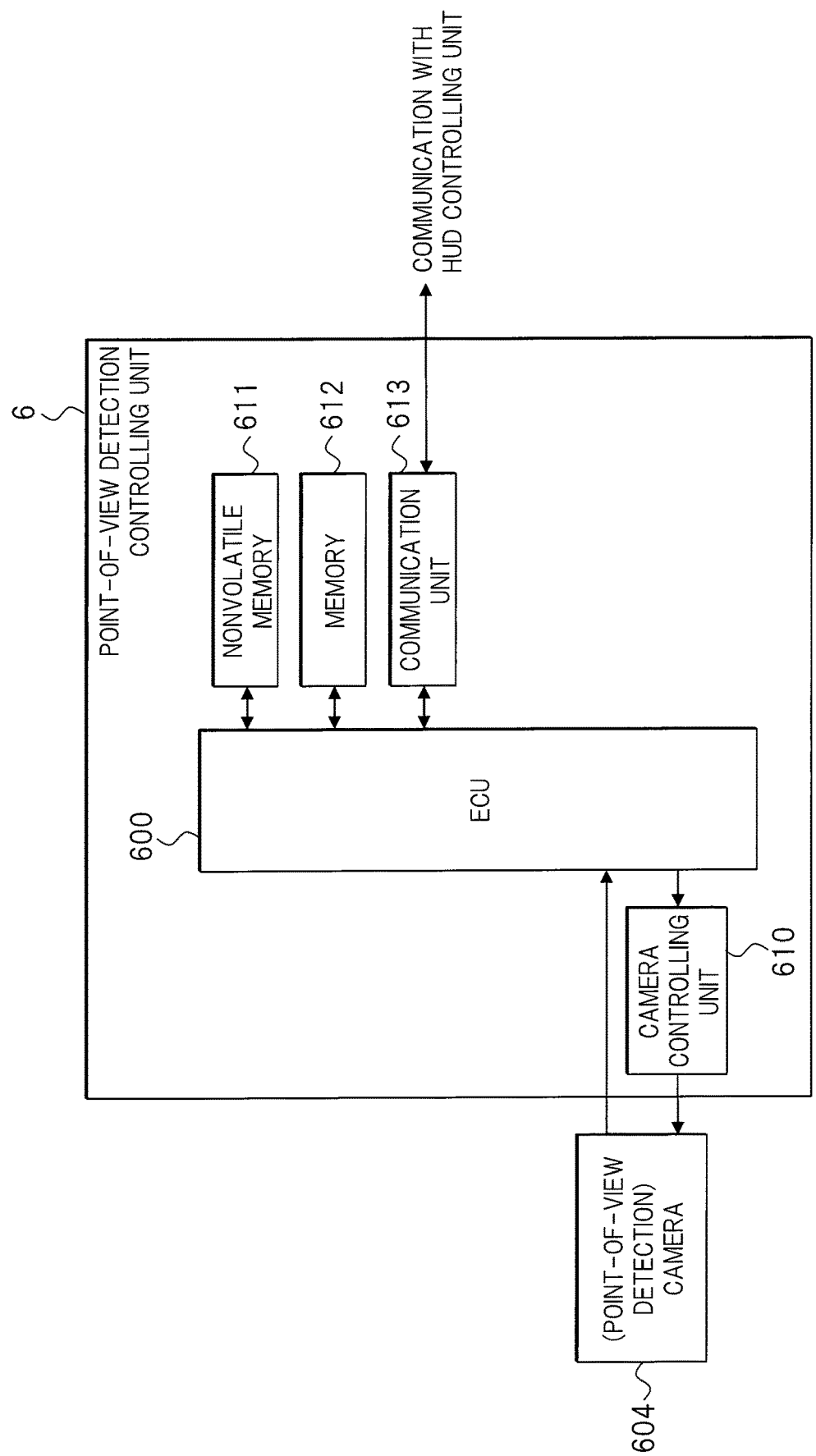
Figure 8:
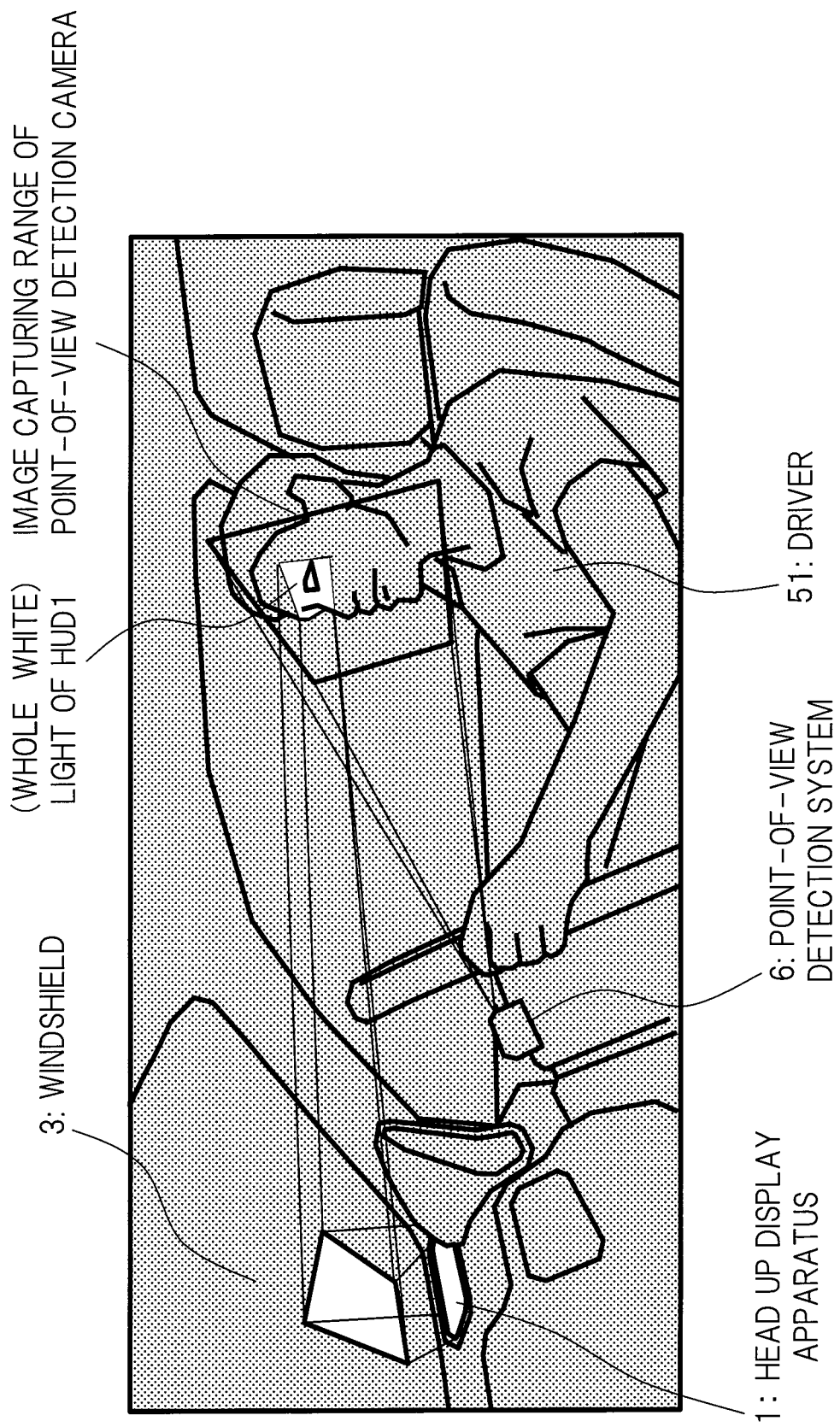

FIG. 1 is a diagram showing one example of an entire configuration of a head up display apparatus according to an embodiment of the present invention;
FIG. 2 is a diagram showing a detailed configuration of a mounting form of the head up display apparatus;
FIG. 3 is a diagram showing a configuration example of a mirror driving unit of the head up display apparatus;
FIG. 4 is a diagram showing a driving example of a mirror driving unit of the head up display apparatus;
FIG. 5 is a block diagram showing one example of a HUD control system of the head up display apparatus;
FIG. 6 is a block diagram showing one example of an information acquiring unit (device) configuring the HUD control system of the head up display apparatus;
FIG. 7 is a block diagram showing one configuration example of a point-of-view detection controlling unit of a HUD-dedicated point-of-view detection system of the head up display apparatus;
FIG. 8 is an entire configuration diagram for explaining detection of a driver's point-of-view position of the head up display apparatus;
FIG. 9 is a flowchart showing details of a detecting operation (positional adjustment) of the driver's point-of-view position of the head up display apparatus;
FIG. 10 is a diagram for explaining a principle of the detecting operation (positional adjustment) of the driver's point-of-view position of the head up display apparatus;

FIG. 11 is a diagram for explaining detection of a distance in a deep direction according to another application example of the head up display apparatus; and FIG. 12 is a diagram for explaining an operational principle of the detection of the distance in the deep direction.

BEST MODE FOR CARRYING OUT THE INVENTION

Hereinafter, embodiments of the present invention will be described in detail on the basis of the drawings. Note that the same components are denoted by the same reference symbols in principle throughout all the drawings for describing the embodiments, and the repetitive description thereof will be omitted. Meanwhile, a part explained with a reference symbol in a certain diagram may be described without illustration again in explanation for another diagram but with the same reference symbol. Each working example described below will be explained in a case in which a head up display (HUD) apparatus is mounted on a vehicle such as a car as an example. However, each working example is also applicable to other vehicles such as a train and an airplane. Further, each working example is also applicable to not only the vehicles but also a HUD apparatus for use in a cargo carry vehicle such as a forklift.

FIG. 1 is a diagram showing an outline of one configuration example of a head up display (HUD) apparatus according to an embodiment of the present invention. In this HUD apparatus 1, the light from the image display apparatus 30 that modulates and projects the light from a light source arranged inside a not-illustrated housing is brought through an optical element 43, is further reflected by a concave mirror 52, is projected to a windshield 3 of a vehicle 2, and is emitted to a point of view 5 of a viewer (driver), so that a desirable projected image is displayed in accordance with a position of the point of view of the viewer. Note that this drawing shows a rotational position of the concave mirror 52, a projection position of the projected image to (an inner surface side of) the windshield 3, and a virtual image displayed on the basis of the positions in accordance with the different positions (A, B and C) of the point of view 5 of a viewer (driver) as A, B and C, respectively. Also, FIG. 1 shows a controlling unit 20 controlling the HUD apparatus 1 including the image display apparatus 30 and the concave mirror 52, and besides, a (in-car) camera 115 configuring a driver monitoring system (DMS) (point-of-view detection system) for use in monitoring posture including the point of view of the driver or others.

Note that a projection-receiving member is not limited to the windshield 3, and a different member such as a combiner is also applicable as long as being a member on which the image is projected. The image display apparatus 30 is configured of, for example, a projector, a LCD (Liquid Crystal Display) or others having a backlight. A self-luminous VFD (Vacuum Fluorescent Display) or others may be applied, or a member that displays the image on a screen by using a projection apparatus may be applied. Such a screen may be made of, for example, a micro lens array obtained by two-dimensionally arranging micro lenses.

The concave mirror 52 is configured of, for example, a free curved mirror, a mirror having an optical-axis asymmetrical shape or others. More specifically, in order to reduce the distortion of the virtual image, a shape of the concave mirror 52 has, for example, a relatively small curvature radius so as to increase a magnification power in an upper region (that has a relatively small distance to the point of view 5 of the driver since the optical rays that have been reflected on this region is reflected on a lower side of the windshield 3) of the concave mirror. On the other hand, the shape of the concave mirror 52 has a relatively large curvature radius so as to decrease the magnification power in a lower region (that has a relatively large distance to the point of view 5 of the driver since the optical rays that have been reflected on this region is reflected on an upper side of the windshield 3) of the concave mirror 52. The image display apparatus 30 may be tilted from the optical axis of the concave mirror 52 so as to correct the difference in the image magnification as described above, which results in the reduction in the distortion itself.

When the driver views an image projected on the windshield 3, the driver visually recognizes the image as a virtual image on a forward part through the transparent windshield 3. At this time, a position of the projection of the image on the windshield 3 is adjusted by adjusting an angle of the concave mirror 52, so that a display position of the virtual image can be adjusted on the basis of a position viewed by the driver in up and down directions. Note that a content displayed as the virtual image is not particularly limited. For example, vehicle information, navigation information, a front scenery image that is captured by a not-illustrated camera (such as a monitoring camera, an around viewer camera or others) or others can be suitably displayed.

A numerical symbol 115 described above is a camera that is attached to a part of a steering wheel and detects, for example, the point of view 5 and the posture of the driver under normal visible light. However, it is not always necessary to attach this camera to the part of the steering wheel as described above. The camera may be attached to, for example, a part of a dashboard or a part of the windshield 3 as long as the detection for the point of view 5 of the driver is achieved.

FIG. 2 shows one example of a detailed structure of the HUD apparatus 1, and shows here that the housing is denoted with numerical symbols 61 and 65. The image display apparatus 30 is configured to include the concave mirror 52 therein. Further, here, a distortion correcting lens or others is denoted with a numerical symbol 43 as an optical element.

In the present example, as clearly seen in the drawing, the concave mirror 52 is arranged so as to freely rotate in a very small angle range because of a pair of shafts formed on side surfaces inside the housings 61 and 65. Further, to a base of the lower housing 65, a main substrate 70 on which a controlling unit or others is mounted and a mirror driving unit 42 made of a moving mechanism including a motor, a worm gear, a wheel and others are attached by a detachable mechanism such as a screw. That is, by this mirror driving unit 42, a tilt angle of the concave mirror 52 can be changed in the very small angle range.

FIG. 3 is a diagram showing an outline of a mounting example of the mirror driving unit 42 for use in changing the tilt angle of the concave mirror 52. In this case, as shown in FIG. 3(a), the mirror driving unit 42 includes, inside a case 421, at least an electric motor 422 having a rotational rate that is controllable in a wide range from high speed rotation to low speed rotation, a worm gear 423 and a plurality of combined gear wheels 424 between an output shaft of this motor and the worm gear. As shown in FIG. 3(b), the worm gear 423 is attached through a partial notch to an outer circumferential part of the housing 50, more specifically to a lower end of the optical-component holding exterior case 55 so as to mesh with a worm wheel 411 formed on a lower end of the concave mirror 52.

As shown in FIG. 4, by the configuration of the mirror driving unit 42, the rotation of the electric motor 422 that is controlled to rotate in the wide range from the low speed to the high speed can be converted to have a desirable rotation rate/driving power through the plurality of wheel gears 424 and can be transmitted to the worm gear 423, and besides, the concave mirror 52 can be moved forward and backward (see an arrow in the drawing) while rotating around the rotational axis by the worm wheel 411 formed on the lower end of the concave mirror 52 so that the concave mirror 52 can be adjusted to have a desirable tilt angle. Note that this drawing shows the plurality of wheel gears 424 so as to have a space therebetween for easily understanding the drawing. However, for those who are skilled in the art, it would be obvious that the wheel gears practically mesh with each other.

Subsequently, the HUD controlling unit 20 has a function of controlling the operation of the HUD apparatus 1, and the function is executed by causing an ECU 21 configured of a CPU (Central Processing Unit) or others to use a software (stored in a nonvolatile memory 22 or a memory 23). The function may be implemented by a hardware such as a microcomputer or a FPGA (Field Programmable Gate Array). As seen in this drawing, the HUD controlling unit 20 drives the image display apparatus 30 on the basis of the vehicle information 4 or others acquired from the vehicle information acquiring unit 10 to form the image to be displayed as the virtual image, and projects the image onto the windshield 3 by causing the concave mirror 52 controlled by the mirror driving unit 42 to reflect the image. In addition to this, the tilt angle of the concave mirror 52 is controlled by the mirror driving unit 42 as described below. The HUD controlling unit 20 includes an audio output unit 24 for use in outputting an audio signal, and besides, a speaker 60 for use in generating the audio.

As shown in FIG. 6, the information acquiring unit (device) includes, for example, a car speed sensor 101, a shift-lever position sensor 102, a headlight sensor 104, an illuminance sensor 105, a chromaticity sensor 106, an engine activation sensor 109, an acceleration sensor 110, a gyrosensor 111, and a temperature sensor 112, and besides, includes a road-to-car communication wireless 113, a car-to-car communication wireless 114, the (in-car) camera 115, a (out-car) camera 116, a GPS receiver 117, a VICS (registered trademark) receiver 118 and others. However, it is not always to include all these devices, or a different type device may be included. In addition, the vehicle information 4 acquired by the included devices can be suitably used. In this manner, the HUD controlling system is made of the information acquiring devices such as various sensors arranged in the respective units of the vehicle 2, and can sense various events caused in the vehicle 2 and acquire and output the vehicle information by sensing/acquiring values of various parameters relating to a running state at a predetermined time interval.

Note that the car speed sensor 101 is arranged for use in recognizing the car speed, and the engine activation sensor 109 is arranged for use in recognizing the engine activation, and starts its system at the time of the engine activation.

Further, FIG. 7 shows one configuration example of the point-of-view detection controlling unit 6 centrally putting the point-of-view detecting camera (denoted with a numerical symbol 604 in FIG. 7) that is the (in-car) camera 115. Also in the present example, the point-of-view detection controlling unit 6 is similarly configured of an ECU 600 that is a calculating processor, a software stored in a nonvolatile memory 611 or a memory 612, the camera controlling unit 610 controlling the camera 604, and others, and operates/controls the point-of-view detecting camera 604 through the camera controlling unit 610, and detects the point-of-view position of the driver on the basis of the image signal output from this point-of-view detecting camera 604. Note that the detection signal is transmitted to the HUD controlling unit 20 through the communication unit 613.

It is basically needless to say that the above-described HUD apparatus adjust/controls the position of the virtual image projected onto the windshield 3 of the vehicle 2 by controlling the tile angle of the concave mirror 52 in accordance with the point-of-view position of the driver by using the point-of-view detecting camera 604 that is the means attached to a part of the steering wheel and detecting the point of view of the driver.

<Detection of Point-of-View Position of Driver>

Subsequently, the detection of the point-of-view position of the driver 5 by the HUD apparatus 1, a detailed configuration of which is described above, will be explained. Note that the present invention achieves the detection of the point-of-view position of the driver even under dark circumstances such as at nighttime or in an indoor parking lot without arrangement of an extra light source such as an infrared LED, that is, by utilization of illumination light of the image display apparatus 30 that is originally an principal component configuring the HUD apparatus 1, and an entire configuration of the present invention is shown in FIG. 8.

As also clearly seen in this drawing, in the present invention, (whole) white light is generated by the HUD apparatus 1, and this white light is utilized as the illumination light for use in the detection of the point-of-view position of the driver 51. In other words, the light (image light) from the HUD apparatus 1 displaying the virtual image to the driver 51 is originally oriented to the point of view of the driver, and therefore, the white light from this HUD apparatus 1 is emitted to a part near a center of eyes of the driver 51. Accordingly, when this emitted white light is utilized as the illumination light, the point-of-view position of the driver 51 can be sensed by using the in-car camera 115 configuring the driver monitoring system (DMS) without the usage of the extra light source such as the infrared LED. Accordingly, since the extra light source such as the infrared LED is unnecessary, increase in the number of constituent components can be suppressed so as to achieve an inexpensive apparatus.

Since the white light as the illumination light generated by the HUD apparatus 1 is emitted, the emission is preferably performed at a timing (such as a case of insertion of an engine (ignition) key) at which the driver 51 takes the driver seat and starts the driving although described in detail later. Also, the illumination light is utilized at not only the nighttime but also even daytime as long as being under the dark circumstance (a location such as the indoor parking lot). On the other hand, under bright circumstance at daytime, the point-of-view position of the driver 51 may be sensed by the in-car camera 115 without the utilization of the white light generated by the HUD apparatus 1. Besides, the white light generated by the HUD apparatus 1 may be lightened if needed on the basis of a sensing signal from an illuminance sensor (see a numerical symbol 105 in FIG. 6) arranged for use in sensing the brightness outside the car.

<Detection Operation (Positional Adjustment) of Point-of-View Position of Driver>

Next, the details of the detection operation (positional adjustment) of the point of view of the driver 51 in the HUD apparatus 1 will be explained below with reference to a flowchart of FIG. 9. As also clearly seen in the above description, note that the HUD apparatus according to the present invention detects the point-of-view position of the driver 51 by emitting the (whole) white light from the HUD apparatus 1 (also referred to as "whole white display" or "HUD light" below), and, as a result, adjusts a direction of the image light displaying the virtual image generated by the mirror driving unit 42 (see FIG. 3 or 4) with reference to the point-of-view position. Therefore, it is basically assumed that the vehicle is not running. The running speed of the vehicle from the car speed sensor 101 (see FIG. 6) is monitored, and, if it is determined that the running speed reaches a predetermined value, it is preferable to immediately stop the adjustment and perform the normal display of the HUD apparatus, or preferable not to perform the display of the HUD apparatus.

First, in FIG. 9, when the detection operation (positional adjustment) of the point-of-view position of the driver 51 is started by the HUD apparatus 1, it is judged whether, for example, a power source (ignition) is turned ON in accordance with the insertion of the engine (ignition) key in order to confirm the activation state of the vehicle (S901). When a result of the judgment is "Yes", the display made by the HUD apparatus 1 is set to the whole white display (also referred to as "whole surface white display") (S902). More specifically, By the control on the image signal input to the image display apparatus 30 by the ECU 21 that is the calculating processor, the HUD light projected from the projector, the LCD (Liquid Crystal Display) or others is changed to, for example, whole white display light that is display light that entirely has single color and horizontally-long rectangular shape, in other words, display light for a horizontal width of a face of a human who is the driver. On the other hand, when the result of the judgment in S901 is "No", the same judgmental process is repeated again after elapse of a predetermined duration.

Next, the mirror driving unit 42 (FIG. 5) of the HUD apparatus 1 is driven in the whole surface white display state, so that the concave mirror 52 is rotated and moved (S903). Note that this rotational movement is performed while the light reciprocates in a certain range on the face of the driver 51 until the point of view of the driver 51 is detected (S904). In other words, as shown in FIG. 10(*a*), the whole surface white display made by the HUD apparatus 1 is normally set so as to be performed near an eyeball on the face of the driver 51. Therefore, by the reciprocating movement on the concave mirror 52 in the certain range, the whole surface white display made by the HUD apparatus 1 can be exactly emitted while moving over the face of the driver 51 as shown in FIGS. 10(*b*) to 10(*c*) to finally reach a part near the eyeball of the driver 51 as shown in FIG. 10(*d*). At this time, it would be preferable to adjust the concave mirror 52 (to a position in FIG. 10(*d*) by using the DMS 6 while checking the HUD light emitted to the driver 51 so that the HUD light is put at an eye center.

According to this, by using the in-car camera 115 configuring the DMS 6, the detection of the point-of-view position of the driver 51 can be exactly executed. Meanwhile, when the result of the judgment (in the detection of the point-of-view position of the driver 51: S904) is continued to be "No" for predetermined time, more specifically when a result of judgment (S905) on whether 10 seconds or longer elapses as point-of-view non-detected time is "No", the process returns to the movement of the concave mirror 52 (S903). On the other hand, when the result is "Yes", in other words, in a case of failure to detect the driver 51, the position of the concave mirror 52 is returned to a default position (S906), and a series of processes are ended (the positional adjustment is ended). Then, the process proceeds to the normal display of the HUD. For those who are skilled in the art, it should be easily appreciated that the detection of the point-of-view position of the driver 51 using the in-car camera 115 can be achieved by extraction of the acquired face image of the driver 51 on the basis of image analysis.

Alternatively, in the present working example, when the result of the judgment (in the detection of the point-of-view position of the driver 51: S904) is "Yes", a taking seat state of the driver 51 at the driver seat is sensed or judged on the basis of the image analysis of the image captured by the in-car camera 115, and a result of the sensing/judgment is displayed. That is, in the present example, first, it is judged whether the detected point of view of the driver 51 is put at the center of the whole surface white light made from the HUD apparatus 1 (S907). Further, it is judged whether the position of the point of view of the driver 51 in the deep direction is near a headrest, in other words, whether the driver takes a correct position of the driver seat (S908).

Then, when the results of both the judgments S907 and S908 are "Yes", the movement of the concave mirror 52 is stopped (S909), and a series of processes are ended. In this case, the whole surface white display made by the HUD apparatus 1 is also stopped at the same time. On the other hand, when the result of the judgment S907 is "No", the process returns to the movement of the concave mirror (S903), and besides, the judgment (in the detection of the point-of-view position of the driver 51: S904) and the judgment (in the detection of whether the point of view is put at the center of the HUD light: S907) are repeated.

Meanwhile, when the result of the judgment S908 is "No", this means that the driver 51 is not taking the correct position of the seat, and therefore, the display of the HUD apparatus 1 is changed to an alert display such as a message "Take the correct position of the seat" encouraging the driver to take the correct position of the seat, only for, for example, a predetermined duration such as three seconds (S910). However, this state has a high possibility in which even the alert display made by the HUD apparatus 1 cannot be viewed by the driver. Therefore, in such a case, in place of or in addition to the display made by the HUD apparatus 1, it is effective to, for example, make an audio output alert from the speaker 60 in FIG. 5.

Then, further, it is judged whether the abode-described alert display is the first (initial) alert (S911). When a result of the judgment is "First Time (Yes)", the process returns to the movement of the concave mirror 52 (S903), and the above-described steps are repeated. In this case, the alert display is returned to the whole surface white display. On the other hand, when the result of the judgment is not the first alert (First Time) but means that the alert has been already done ("No"), this means that the position of the driver is incorrect, and therefore, the concave mirror 52 is returned to the default position (S912), and a series of the processes are ended (the positional adjustment is ended), and then, the process proceeds to the normal display of the HUD apparatus 1.

Other Application Example

When the position of the point of view 5 of the driver 51 is sensed by only using the camera image from the in-car camera 115 as described above, a distance in the deep direction is unclear (or incorrect), and sufficient accuracy cannot be obtained in some cases. Accordingly, it is preferable to correctly measure the distance to this point of view (in the deep direction) in addition to the position of the point of view 5 of the driver 51, and therefore, an application example for this manner will be described in detail below.

The section of the above-described working example has described the movement of the HUD light on the face of the driver 51 in the up and down directions, the HUD light entirely having the single color and the horizontal-long rectangular shape (further, a width in the vertical direction is also preferably constant) projected from the HUD apparatus 1. That is, when the concave mirror 52 moves at a constant speed, the HUD light projected from the HUD apparatus 1 is configured as shown in FIG. 11 so that a distance from the light source to the face is smaller as the face of the driver 51 is closer to a front side (steering side) while the distance from the light source to the face is larger as the face of the same is closer to aback side (headrest side). As a result, when the concave mirror 52 is moved at a constant speed, a movement amount of the HUD light is smaller as the face is closer to the front side while the movement amount of the HUD light is larger as the face is closer to the back side (see an arrow if FIG. 11).

When this manner is utilized, the movement amount (the number of pixels) per unit time in a boarder of the HUD light can be converted to the distance, so that the distance to the driver 51 in the deep direction can be obtained. This manner is shown in FIG. 12. The widths of the HUD light in the vertical direction on the face of the driver 51 at time "t=$t_0$, $t_1$ and $t_2$" or the movement amounts $L_1$ and $L_2$ when the face of the driver 51 is closer to the front side (steering side) (see FIG. 12(a)) are smaller than the widths of the HUD light in the vertical direction on the face of the driver 51 at the time "t=$t_0$, $t_1$ and $t_2$" or the movement amounts $L_1$' and $L_2$' when the face of the driver 51 is closer to the back side (headrest side) (see FIG. 12(b)) as clearly seen in the drawing ($L_1$<$L_1$', $L_2$<$L_2$'). Note that it would be obvious that the conversion of the distance to the driver 51 in the deep direction is easily achieved by the ECU 600.

The section of the above explanation has described that the HUD light generated by the HUD apparatus 1 for use in performing the detection operation (positional adjustment) of the point-of-view position of the driver 51 is the (whole) white light. This light is selected for more correctly measuring the distance from the in-camera 115 to the point of view of the driver. However, the present invention is not limited to this light. For example, in place of the white light, the light entirely having single different color such as yellow green that is soft for the human eyes is also applicable. Also, the HUD light can have not only entirely the single color and the horizontal-long rectangular shape but also a grid display having a horizontally and vertically crossing grid shape in the rectangular-shaped light in further consideration of the analysis on the image (such as analysis on the movement amount) from the in-camera 115 and others.

As described above in detail, according to the HUD apparatus 1 of the working example of the present invention, the point-of-view position of the driver who is the viewer for the virtual-image projected image can be exactly detected by utilizing the driver monitoring system (DMS) generally mounted on this apparatus and driven by the visible light to confirm the position of the driver. This manner achieves a head up display apparatus that is practical as well as economically excellent and can cause the more favorable control for the virtual-image projected image.

In the foregoing, the invention made by the present inventors has been concretely described on the basis of the working examples. However, it is needless to say that the present invention is not limited to the foregoing working examples, and various modifications can be made within the scope of the present invention. For example, the above-described working examples have been explained in detail for easily understanding the present invention, and are not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

INDUSTRIAL APPLICABILITY

The present invention can be utilized for a head up display apparatus that projects images onto a transparent glass plate or others.

EXPLANATION OF REFERENCE CHARACTERS

1 . . . HUD apparatus, 2 . . . vehicle, 3 . . . windshield, 4 . . . vehicle information, 5 . . . point of view of driver, 6 . . . point-of-view detecting system (point-of-view detection controlling unit), 20 . . . controlling unit, 21 . . . ECU, 22 . . . nonvolatile memory, 23 . . . memory, 30 . . . image display apparatus, 42 . . . mirror driving unit, 51 . . . driver, 101 . . . car speed sensor, 109 . . . engine activation sensor

The invention claimed is:
1. A head up display apparatus comprising:
an image display apparatus configured to have a light source and a display element and form an image;
an image-light projecting unit configured to display a virtual image onto a forward part of a vehicle by projecting the image light emitted from the image display apparatus to be reflected on a windshield; and
a driver's point-of-view sensing unit configured to sense a point of view of the driver,
wherein the image light emitted from the image display apparatus is used as illumination light having a constant width in a vertical direction to sense the point of view of the driver in a predetermined state of the vehicle,
wherein in a state that a running speed of the vehicle has not reached a predetermined value and the image light emitted from the image display apparatus is a single-color visible light, the driver's point-of-view sensing unit senses the point of view of the driver by irradiating the image light on a face of the driver and reciprocating the image-light projecting unit within a certain range to vertically move the irradiated image light on the face of the driver to sense the point of view of the driver,
wherein a direction of the image light projected by the image-light projecting unit is adjusted based on a position of the point of view of the driver sensed by the driver's point-of-view sensing unit, and
wherein in a state that a running speed of the vehicle exceeds the predetermined value, the adjustment of the direction of the image light projected by the image-light projecting unit is stopped.
2. The head up display apparatus according to claim 1, wherein the predetermined state of the vehicle includes a state in which the driver takes a driver's seat.
3. The head up display apparatus according to claim 1, wherein the predetermined state of the vehicle includes a state in which the driver activates the vehicle.

4. The head up display apparatus according to claim 1, wherein the image-light projecting unit includes a unit configured to move the illumination light in up and down directions along a face of the driver.

5. The head up display apparatus according to claim 4, wherein the driver's point-of-view sensing unit further detects a position of the point of view of the driver in a deep direction.

6. The head up display apparatus according to claim 1, wherein the illumination light generated by the image display apparatus is white light.

7. The head up display apparatus according to claim 1, wherein the driver's point-of-view sensing unit further includes a unit configured to alert the driver of a detection result of the driver's point-of-view sensing unit through audio.

8. The head up display apparatus according to claim 1, wherein the illumination light is rectangular-shaped light having a horizontal width corresponding to a horizontal width of the face of the driver.

9. The head up display apparatus according to claim 8, wherein grid display is further added to the rectangular-shaped light.

\* \* \* \* \*